United States Patent
Sato et al.

(10) Patent No.: US 11,348,712 B2
(45) Date of Patent: May 31, 2022

(54) INSULATOR-COATED SOFT MAGNETIC POWDER, POWDER MAGNETIC CORE, MAGNETIC ELEMENT, ELECTRONIC DEVICE, AND VEHICLE

(71) Applicant: Seiko Epson Corporation, Tokyo (JP)

(72) Inventors: Toshikuni Sato, Hachinohe (JP); Atsushi Nakamura, Hachinohe (JP)

(73) Assignee: Seiko Epson Corporation

( * ) Notice: Subject to any disclaimer, the term of this patent is extended or adjusted under 35 U.S.C. 154(b) by 846 days.

(21) Appl. No.: 16/145,304

(22) Filed: Sep. 28, 2018

(65) Prior Publication Data

US 2019/0103207 A1 Apr. 4, 2019

(30) Foreign Application Priority Data

Sep. 29, 2017 (JP) .............................. JP2017-190946

(51) Int. Cl.
| | |
|---|---|
| *H01F 1/33* | (2006.01) |
| *H01F 27/24* | (2006.01) |
| *B22F 1/02* | (2006.01) |
| *B22F 1/00* | (2022.01) |
| *C03C 8/04* | (2006.01) |
| *C03C 3/066* | (2006.01) |
| *H01F 3/08* | (2006.01) |
| *H01F 1/24* | (2006.01) |
| *G11B 5/66* | (2006.01) |

(Continued)

(52) U.S. Cl.
CPC ................. *H01F 1/33* (2013.01); *B22F 1/05* (2022.01); *B22F 1/16* (2022.01); *C03C 3/066* (2013.01); *C03C 8/04* (2013.01); *G11B 5/66* (2013.01); *H01F 1/24* (2013.01); *H01F 3/08* (2013.01); *H01F 27/24* (2013.01); *B22F 2301/35* (2013.01); *B22F 2302/25* (2013.01); *B22F 2304/10* (2013.01); *C03C 2207/00* (2013.01); *H01F 17/062* (2013.01); *H01F 27/2823* (2013.01); *H01F 2017/048* (2013.01)

(58) Field of Classification Search
CPC ....................................................... B22F 1/02
See application file for complete search history.

(56) References Cited

U.S. PATENT DOCUMENTS

| | | |
|---|---|---|
| 2011/0266031 A1 | 11/2011 | Kim |
| 2017/0063172 A1 | 3/2017 | Shiohara et al. |

FOREIGN PATENT DOCUMENTS

| | | |
|---|---|---|
| DE | 102016102386 A1 | 8/2017 |
| JP | H06-024797 A | 2/1994 |

(Continued)

OTHER PUBLICATIONS

Extended European Search Report for Patent Application No. EP 18197159.9 dated Feb. 14, 2019 (7 pages).

*Primary Examiner* — Alexandre F Ferre

(74) *Attorney, Agent, or Firm* — Harness, Dickey & Pierce, P.L.C.

(57) ABSTRACT

An insulator-coated soft magnetic powder includes a plurality of particles each including a core which contains a soft magnetic material, and an insulating layer which is provided on the surface of the core and contains a glass material including $Bi_2O_3$ as a main component. The content of an alkali metal in the insulating layer is 5 mol % or less. The glass material further contains at least one of ZnO and $B_2O_3$. The content of $Bi_2O_3$ in the glass material is 40 mol % or more and 80 mol % or less.

18 Claims, 6 Drawing Sheets

(51) Int. Cl.
  *B22F 1/05* (2022.01)
  *B22F 1/16* (2022.01)
  *H01F 17/04* (2006.01)
  *H01F 17/06* (2006.01)
  *H01F 27/28* (2006.01)

(56) References Cited

FOREIGN PATENT DOCUMENTS

| | | | |
|---|---|---|---|
| JP | 2005-311196 | A | 11/2005 |
| JP | 2008-226960 | A | 9/2008 |
| JP | 2009-032739 | A | 2/2009 |
| JP | 2010-062424 | A | 3/2010 |
| JP | 2010-177271 | A | 8/2010 |
| JP | 2010-251600 | A | 11/2010 |
| JP | 5381219 | B2 | 1/2014 |
| JP | 2016-210667 | A | 12/2016 |

INSULATOR-COATED SOFT MAGNETIC POWDER, POWDER MAGNETIC CORE, MAGNETIC ELEMENT, ELECTRONIC DEVICE, AND VEHICLE

BACKGROUND

1. Technical Field

The present invention relates to an insulator-coated soft magnetic powder, a powder magnetic core, a magnetic element, an electronic device, and a vehicle.

2. Related Art

Recently, advances have been realized in the reduction in size and weight of mobile devices such as notebook computers. However, in order to simultaneously achieve a reduction in size and an enhancement of performance, it is necessary to increase the frequency of a switched-mode power supply. At present, the driving frequency of a switched-mode power supply has been increased to several hundred kilo hertz or more. However, accompanying this, a magnetic element such as a choke coil or an inductor which is built in a mobile device also needs to be adapted to cope with the increase in the frequency.

However, in the case where the driving frequency of such a magnetic element is increased, there arises a problem that a Joule loss (eddy current loss) due to an eddy current is significantly increased in a magnetic core included in each magnetic element.

In order to solve such a problem, for example, JP-A-2008-226960 discloses a stacked inductor formed using a metallic magnetic material in which insulation between particles of a soft magnetic powder is achieved with a glass. In the stacked inductor described in JP-A-2008-226960, by using a glass containing $Bi_2O_3$, even if a heat treatment at a high temperature of 800 to 900° C. is performed, the electrical resistivity can be improved. Therefore, a stacked inductor having a favorable insulating property is obtained.

However, recently, an environment where an inductor is used has become more and more tough, and for example, the use thereof in an engine bay (compartment) of an automobile is also assumed. However, the inside of an engine bay is an environment where a high temperature lasts a long time. Therefore, the inductor described in JP-A-2008-226960 has a problem that the insulating property is gradually deteriorated. As a result, the eddy current loss of the inductor is increased and also a short circuit between terminals is likely to occur.

SUMMARY

An advantage of some aspects of the invention is to provide an insulator-coated soft magnetic powder having a high insulating property at a high temperature, and a powder magnetic core, a magnetic element, an electronic device, and a vehicle, each having high reliability at a high temperature.

The advantage can be achieved by the following configurations.

An insulator-coated soft magnetic powder according to an aspect of the invention includes a core which contains a soft magnetic material, and an insulating layer which is provided on an entirety of the surface of the core and contains a glass material including $Bi_2O_3$ as a main component, wherein the content of an alkali metal in the insulating layer is 5 mol % or less.

According to this configuration, an insulator-coated soft magnetic powder having a high insulating property at a high temperature is obtained.

In the insulator-coated soft magnetic powder according to the aspect of the invention, it is preferred that the glass material further contains at least one of ZnO and $B_2O_3$.

By containing ZnO, the electrical resistance of the glass material can be further increased, and also the mechanical strength of the glass material can be increased. Further, by containing $B_2O_3$, vitrification of the glass material can be facilitated. That is, the crystallization of the glass material is suppressed, and a defect accompanying this, for example, a defect such as the occurrence of irregularities of an insulating layer or the decrease in the electrical resistance can be suppressed.

In the insulator-coated soft magnetic powder according to the aspect of the invention, it is preferred that the content of $Bi_2O_3$ in the glass material is 40 mol % or more and 80 mol % or less.

According to this configuration, while sufficiently enhancing the insulating property at a high temperature, the effect of adding a secondary component can also be obtained simultaneously. That is, the effect of the main component and the effect of the secondary component can be obtained simultaneously.

In the insulator-coated soft magnetic powder according to the aspect of the invention, it is preferred that the average particle diameter is 1 μm or more and 50 μm or less.

According to this configuration, a path through which an eddy current flows can be shortened, and therefore, insulator-coated soft magnetic particles capable of sufficiently suppressing an eddy current loss generated in the particles are obtained. Further, the average particle diameter is moderately small, and therefore, the filling property when the powder is compacted can be enhanced. As a result, the filling density of a powder magnetic core is increased, and thus, the saturation magnetic flux density and the magnetic permeability of the powder magnetic core can be increased.

A powder magnetic core according to an aspect of the invention includes the insulator-coated soft magnetic powder according to the aspect of the invention.

According to this configuration, a powder magnetic core having high reliability at a high temperature is obtained.

A magnetic element according to an aspect of the invention includes the powder magnetic core according to the aspect of the invention.

According to this configuration, a magnetic element having high reliability at a high temperature is obtained.

An electronic device according to an aspect of the invention includes the magnetic element according to the aspect of the invention.

According to this configuration, an electronic device having high reliability is obtained.

A vehicle according to an aspect of the invention includes the magnetic element according to the aspect of the invention.

According to this configuration, a vehicle having high reliability is obtained.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, an insulator-coated soft magnetic powder, a powder magnetic core, a magnetic element, an electronic device, and a vehicle according to the invention will be described in detail based on preferred embodiments shown in the accompanying drawings.

Insulator-Coated Soft Magnetic Powder

First, an insulator-coated soft magnetic powder according to a first embodiment will be described.

Figure 1:
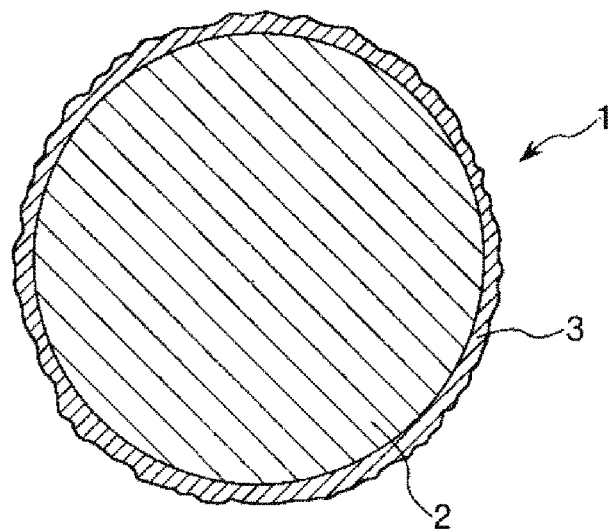
FIG. 1 is a longitudinal cross-sectional view showing one particle of an embodiment of an insulator-coated soft magnetic powder according to the invention.

FIG. 1 is a longitudinal cross-sectional view showing one particle of an embodiment of an insulator-coated soft magnetic powder according to the invention. In the following description, the "one particle of an insulator-coated soft magnetic powder" is also referred to as "insulator-coated soft magnetic particle".

An insulator-coated soft magnetic particle 1 shown in FIG. 1 includes a core 2 which has a particulate shape and is constituted by a soft magnetic material and an insulating layer 3 which entirely covers the surface of the core 2. The insulator-coated soft magnetic powder according to this embodiment is configured such that the insulating layer 3 contains a glass material including $Bi_2O_3$ as a main component and the content of an alkali metal in the insulating layer 3 is 5 mol % or less.

In such an insulator-coated soft magnetic particle 1, an insulating property between particles is ensured by entirely covering the surface with the insulating layer 3. Therefore, by molding such insulator-coated soft magnetic particles 1 into a predetermined shape, a powder magnetic core capable of realizing a magnetic element having a low eddy current loss can be produced.

In particular, by containing a glass material including $Bi_2O_3$ as a main component in the insulating layer 3 and setting the content of an alkali metal in the insulating layer 3 to 5 mol % or less, the decrease in the insulating property can be suppressed even if the particle is left at a high temperature for a long period of time, and the particle has a high insulating property even at a high temperature. Therefore, with the use of such an insulator-coated soft magnetic particle 1, a powder magnetic core and a magnetic element having high reliability at a high temperature can be realized.

Hereinafter, an example of a method for producing the insulator-coated soft magnetic particle 1 shown in FIG. 1 will be described in detail.

Such an example of the production method is a method in which an insulating material particle (hereinafter abbreviated as "insulating particle") having a smaller particle diameter than that of the core 2 is mechanically adhered to the core 2. The adhered insulating particle forms the insulating layer 3, whereby the insulator-coated soft magnetic particle 1 is obtained.

Figure 2:
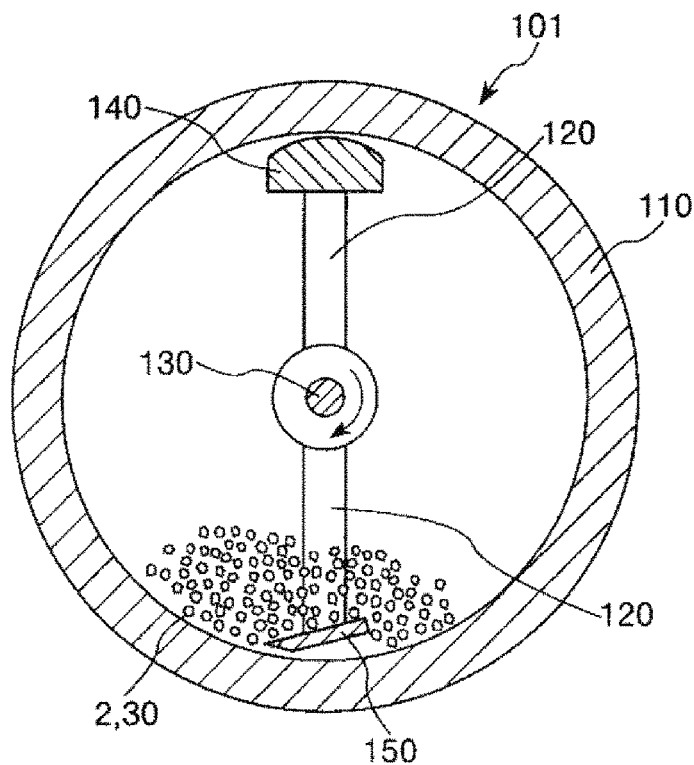
FIG. 2 is a longitudinal cross-sectional view showing a structure of a powder coating device.
Figure 3:
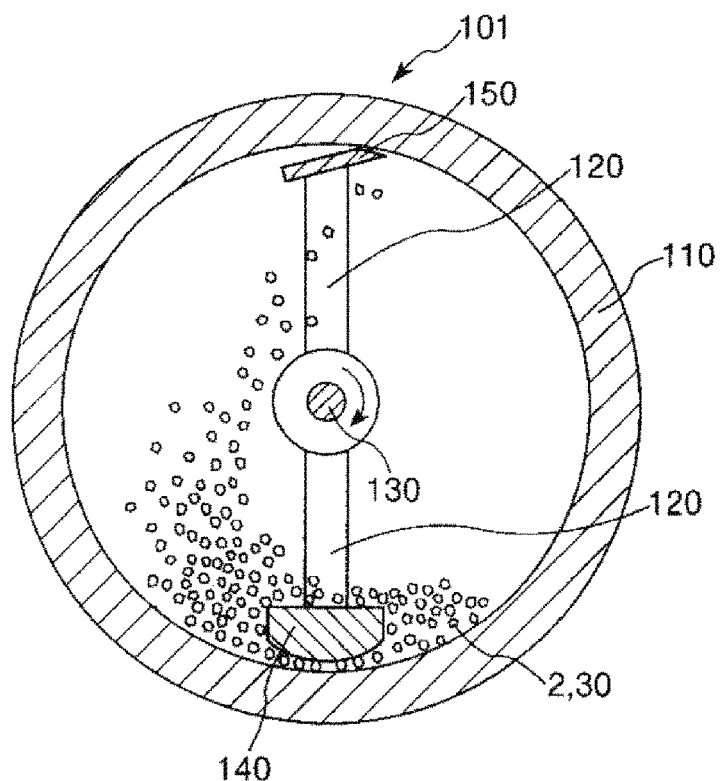
FIG. 3 is a longitudinal cross-sectional view showing a structure of the powder coating device.

FIGS. 2 and 3 are each a longitudinal cross-sectional view showing a structure of a powder coating device.

First, a core 2 and an insulating particle 30 (see FIG. 2) are prepared.

The core 2 is a particle containing a soft magnetic material. Preferably, the soft magnetic material is contained as a main material, but an impurity may also be contained.

As the soft magnetic material, for example, pure iron, various types of Fe-based alloys such as silicon steel (Fe—Si-based alloy), permalloy (Fe—Ni-based alloy), permendur (Fe—Co-based alloy), an Fe—Si—Al-based alloy such as Sendust, and an Fe—Cr—Si-based alloy, and other than these, various types of Ni-based alloys, various types of Co-based alloys, various types of amorphous alloys, and the like are exemplified. Among these, various types of Fe-based alloys are preferably used from the viewpoint of magnetic properties such as a magnetic permeability and a magnetic flux density, and productivity such as cost.

Such a core 2 may be produced by any method, but is produced by, for example, any of various powdering methods such as an atomization method (for example, a water atomization method, a gas atomization method, a spinning water atomization method, etc.), a reducing method, a carbonyl method, and a pulverization method.

Among these, as the core 2, one produced by an atomization method is preferably used. By using an atomization method, an extremely fine powder can be efficiently produced. Further, the shape of each particle of the obtained powder approximates to a complete sphere, and therefore, the ease of rolling of the core 2 is improved, and as described later, an effect that the insulating layer 3 is easily formed in a uniform manner occurs.

On the other hand, the insulating particle 30 is a particle containing an insulating material.

In this embodiment, as this insulating material, a glass material including $Bi_2O_3$ as a main component is used. The main component refers to a component whose content (mol %) is the highest among the components which make up the glass material (for example, a glass forming oxide). Therefore, in the glass material according to this embodiment, the content of $Bi_2O_3$ is the highest.

The content of $Bi_2O_3$ in the glass material is set to preferably 40 mol % or more and 80 mol % or less, more preferably 45 mol % or more and 75 mol % or less, and further more preferably 50 mol % or more and 70 mol % or less. By setting the content thereof within such a range, while sufficiently enhancing the insulating property at a high temperature, the effect of adding the below-mentioned secondary component can also be obtained simultaneously. That is, the effect of the main component and the effect of the secondary component can be obtained simultaneously.

Such a glass material may contain a secondary component whose content is smaller than that of the main component. Examples of the secondary component include $B_2O_3$, $SiO_2$, $Al_2O_3$, ZnO, SnO, $P_2O_5$, PbO, $Li_2O$, $Na_2O$, $K_2O$, MgO, CaO, SrO, BaO, $Gd_2O_3$, $Y_2O_3$, $La_2O_3$, and $Yb_2O_3$.

The secondary component refers to a component whose content (mol %) is the second highest after the main component.

Among these, the glass material preferably further contains at least one of ZnO and $B_2O_3$. That is, the secondary component is preferably at least one of ZnO and $B_2O_3$.

By containing ZnO, the electrical resistance of the glass material can be further increased, and also the mechanical strength of the glass material can be increased. As a result, while further enhancing the insulating property at a high temperature of the above-mentioned insulator-coated soft magnetic particle 1, suppression of a defect or the like of the insulating layer 3 due to the contact between the particles can also be achieved. Then, the insulator-coated soft magnetic particle 1 capable of realizing a powder magnetic core or the like having higher reliability at a high temperature is obtained.

Further, by containing $B_2O_3$, vitrification of the glass material can be facilitated. That is, the crystallization of the glass material is suppressed, and a defect accompanying this, for example, a defect such as the occurrence of irregularities of the insulating layer 3 or the decrease in the electrical resistance can be suppressed. As a result, the insulator-coated soft magnetic particle 1 in which the insulating property at a high temperature is particularly high, and even if the particles collide with one another, the insulating layer 3 is hardly adversely affected is obtained. Then, the insulator-coated soft magnetic particle 1 capable of realizing a powder magnetic core or the like having higher reliability at a high temperature is obtained.

ZnO and $B_2O_3$ hardly mutually inhibit the respective effects described above. Therefore, by containing both ZnO and $B_2O_3$ in the glass material, a favorable glass material having the respective effects described above is obtained.

The content of ZnO in the glass material is set according to the content of $Bi_2O_3$. Specifically, the content of ZnO is preferably 10 mol % or more and 90 mol % or less, more preferably 15 mol % or more and 70 mol % or less, and further more preferably 25 mol % or more and 50 mol % or less with respect to the content of $Bi_2O_3$. By setting the content thereof within such a range, the effect of ZnO can be sufficiently obtained without deteriorating the effect of $Bi_2O_3$ described above.

That is, when the content of ZnO is less than the above lower limit, depending on the content of the main component, or the composition, content, or the like of the other secondary component, the effect of ZnO may be hardly exhibited. On the other hand, when the content of ZnO exceeds the above upper limit, the effect of $Bi_2O_3$ may be inhibited.

The content of $B_2O_3$ in the glass material is also set according to the content of $Bi_2O_3$. Specifically, the content of $B_2O_3$ is preferably 10 mol % or more and 90 mol % or less, more preferably 15 mol % or more and 70 mol % or less, and further more preferably 25 mol % or more and 50 mol % or less with respect to the content of $Bi_2O_3$. By setting the content thereof within such a range, the effect of $B_2O_3$ can be sufficiently obtained without deteriorating the effect of $Bi_2O_3$ described above.

That is, when the content of $B_2O_3$ is less than the above lower limit, depending on the content of the main component, or the composition, content, or the like of the other secondary component, the effect of $B_2O_3$ may be hardly exhibited. On the other hand, when the content of $B_2O_3$ exceeds the above upper limit, the effect of $Bi_2O_3$ may be inhibited.

In the case where the glass material contains both ZnO and $B_2O_3$, the ratio of the content (mol %) of $B_2O_3$ to the content (mol %) of ZnO is preferably 0.5 or more and less than 1.3, more preferably 0.7 or more and 1.1 or less, and further more preferably 0.8 or more and 1.05 or less. By setting the ratio within such a range, the effect of ZnO and the effect of $B_2O_3$ can be balanced. As a result, the insulator-coated soft magnetic particle 1 in which the insulating property at a high temperature is particularly high and also the mechanical strength of the insulating layer 3 is sufficiently high is obtained.

The glass material according to this embodiment may contain at least one of $SiO_2$ and $Al_2O_3$ (third component) at a content less than that of the secondary component. According to this, the vitrification, the insulating property, and the mechanical strength of the insulating layer 3 can be balanced, and the insulator-coated soft magnetic particle 1 having stabilized properties is obtained.

The phrase "a content less than that of the secondary component" means that each of the content (mol %) of $SiO_2$ and the content (mol %) of $Al_2O_3$ is further smaller than the smaller of the content (mol %) of ZnO and the content (mol %) of $B_2O_3$.

The content of $SiO_2$ is not particularly limited, but is preferably 0.05 mol % or more and 10 mol % or less, more preferably 0.1 mol % or more and 8 mol % or less.

The content of $Al_2O_3$ is not particularly limited, but is preferably 0.05 mol % or more and 5 mol % or less, more preferably 0.1 mol % or more and 3 mol % or less.

By setting the contents thereof within the above ranges, the balance among the vitrification, the insulating property, and the mechanical strength of the insulating layer 3 can be further refined.

The glass material according to this embodiment may contain a component other than the main component, the secondary component, and the third component, and as the component, for example, a material is appropriately selected from the above-mentioned components as the secondary component and used.

On the other hand, the content of $P_2O_5$ is preferably less than 0.5 mol %, more preferably 0.1 mol % or less. According to this, the hygroscopicity of the glass material can be suppressed. Due to this, the decrease in the insulating property accompanying moisture absorption can be avoided, and the insulator-coated soft magnetic particle 1 having a more favorable insulating property is obtained.

The contents of the above-mentioned respective components are measured, for example, by inductively coupled plasma optical emission spectrometry (ICP).

The softening point of the glass material is preferably 650° C. or lower, more preferably 250° C. or higher and 600° C. or lower, and further more preferably 300° C. or higher and 500° C. or lower. When the softening point of the glass material is within the above range, the deterioration of the insulating layer 3 even at a high temperature is suppressed. According to this, the insulator-coated soft magnetic particle 1 having a favorable insulating property even at a high temperature is obtained.

The softening point of the glass material is measured by the measurement method for the softening point specified in JIS R 3103-1.

Further, other than the glass material, an electrically non-conductive inorganic material such as a ceramic material or a silicon material may be added to the insulating particle 30 to such an extent that the properties of the glass material are not deteriorated. In such a case, the added amount thereof is set to, for example, about 10 mass % or less.

The average particle diameter of the insulating particles 30 is not particularly limited, but is preferably 0.3 μm or more and 20 μm or less, more preferably 0.5 μm or more and 15 μm or less, and further more preferably 0.8 μm or more and 10 μm or less. By setting the average particle diameter of the insulating particles 30 within the above range, when the insulating particle 30 is mechanically adhered to the core 2 in the below-mentioned step, a pressure can be effectively applied to the insulating particle 30. As a result, the insulating layer 3 which is favorably tightly fixed to the core 2 is easily formed.

The average particle diameter of the insulating particles 30 is a particle diameter at a cumulative frequency of 50% from a small diameter side in a cumulative frequency distribution on a volume basis obtained by a laser diffraction-type particle size distribution analyzer.

Second, the insulating particle 30 is mechanically adhered to the core 2. By doing this, the insulating layer 3 is formed on the entire surface of the core 2, whereby the insulator-coated soft magnetic particle 1 is obtained.

This mechanical adhesion occurs by pressing the insulating particle 30 against the surface the core 2 at a high pressure. Specifically, the insulator-coated soft magnetic particle 1 is produced by causing the above-mentioned mechanical adhesion using a powder coating device 101 as shown in FIGS. 2 and 3.

Examples of a device that causes mechanical compression and a friction action on the core 2 and the insulating particle 30 include various types of pulverizers such as a hammer mill, a disk mill, a roller mill, a ball mill, a planetary mill, and a jet mill, and various types of friction mixers such as Angmill (registered trademark), a high-speed oval mixer, a Mix Muller (registered trademark), a Jacobson mill, Mechanofusion (registered trademark), and Hybridization (registered trademark). Here, as one example, the powder coating device 101 (friction mixer) shown in FIGS. 2 and 3 including a container 110 and a chip 140 which rotates along the inner wall of the container inside the container will be described. Such a powder coating device 101 can efficiently cause mechanical adhesion of the insulating particle 30 to the core 2.

The powder coating device 101 includes the container 110 which has a cylindrical shape and an arm 120 which is rod shaped and is provided along the radial direction inside the container.

The container 110 is constituted by a metal material such as stainless steel, and mechanical compression and a friction are given to a mixture of the cores 2 and the insulating particles 30 fed into the container.

At the center in the longitudinal direction of the arm 120, a rotation axle 130 is inserted, and the arm 120 is rotatably provided with this rotation axle 130 as the center of rotation. The rotation axle 130 is provided so as to coincide with the central axis of the container 110.

At one end of the arm 120, the chip 140 is provided. This chip 140 has a Kamaboko-like shape (half-cylindrical shape) with a convex curved surface and a planar surface opposite the curved surface, and the curved surface faces the inner wall of the container 110, and the separation distance between this curved surface and the container 110 is set to a predetermined length. According to this, the chip 140 can rotate along the inner wall of the container 110 while maintaining a given distance from the inner wall with the rotation of the arm 120.

At the other end of the arm 120, a scraper 150 is provided. This scraper 150 is a plate-shaped member, and in the same manner as the chip 140, the separation distance between the scraper 150 and the container 110 is set to a predetermined length. According to this, the scraper 150 can scrape materials near the inner wall of the container 110 with the rotation of the arm 120.

The rotation axle 130 is connected to a rotation driving device (not shown) provided outside the container 110 and thus can rotate the arm 120.

The container 110 can maintain a sealed state while driving the powder coating device 101 and can maintain the inside in a reduced pressure (vacuum) state or a state of being replaced with any of a variety of gases. The gas inside the container 110 is preferably replaced with an inert gas such as nitrogen or argon.

Next, a method for producing the insulator-coated soft magnetic particle 1 using the powder coating device 101 will be described.

First, the cores 2 and the insulating particles 30 are fed into the container 110. Subsequently, the container 110 is sealed and the arm 120 is rotated.

FIG. 2 shows a state of the powder coating device 101 when the chip 140 is located on the upper side and the scraper 150 is located on the lower side, and on the other hand. FIG. 3 shows a state of the powder coating device 101 when the chip 140 is located on the lower side and the scraper 150 is located on the upper side.

The cores 2 and the insulating particles 30 are scraped as shown in FIG. 2 by the scraper 150. According to this, the cores 2 and the insulating particles 30 are lifted with the rotation of the arm 120 and thereafter fall, and thus are stirred.

On the other hand, as shown in FIG. 3, when the chip 140 descends, the cores 2 and the insulating particles 30 penetrate into a space between the chip 140 and the container 110 and are abuttingly compressed (a compression action and a friction action) by the chip 140 with the rotation of the arm 120.

By repeating the stirring and the compression/friction actions at a high speed, the insulating particles 30 adhere to the surfaces of the cores 2. It is considered that this adhesion occurs by various mechanisms, including fusion of particle surfaces by mechanical compression. A plurality of insulating particles 30 having a small particle diameter gather and are adhered so as to cover the surface of each core 2, and in the end, the adhered insulating particles 30 are connected to one another to form the insulating layers 3 which cover the entire surface of each of the cores 2. The insulator-coated soft magnetic particle 1 is produced in this manner. In the formed insulating layer 3, the insulating particles 30 are often in a state where the original shape as the particle is substantially maintained. Therefore, the insulating layer 3 is likely to have a uniform thickness without being partially thinned.

The rotational speed of the arm 120 slightly varies depending on the amount of the powder fed into the container 110, but is preferably set to about 300 to 1200 revolutions per minute.

The pressing force when the chip 140 compresses the powder varies depending on the size of the chip 140, but is preferably, for example, about 30 to 500 N.

The thus formed insulating layer 3 is obtained by mechanically adhering the insulating particles 30 to the surface of each core 2, and therefore, the adhesion property is extremely high regardless of the state of the surface of the core 2. Therefore, the insulating layer 3 can be prevented from peeling for a long period of time, and the insulating property at a high temperature of the insulator-coated soft magnetic particle 1 can be maintained for a long period of time.

The film formation of the insulating layer 3 as described above can be performed under a dry condition unlike a coating method using an aqueous solution, and moreover can also be performed in an inert gas atmosphere. Therefore, there is no fear that moisture or the like is interposed between the core 2 and the insulating layer 3 during the film formation process, and thus, the long-term durability of the insulator-coated soft magnetic particle 1 can be further enhanced.

Even in the case where a foreign substance, a passivation film, or the like is adhered to the surface of the core 2 to possibly inhibit the film formation of the insulating layer 3, the foreign substance or the like can be removed or the passivation film can be destroyed by the compression and friction actions. According to this, the insulating layer 3 can be more reliably formed.

Further, by using a material having a softening point within the above range as the glass material that constitutes the insulating particle 30, the surfaces of the insulating particles 30 are softened by the above-mentioned compression and friction actions, and the insulating particles 30 can be adhered to the surface of the core 2 with no gaps. According to this, the insulator-coated soft magnetic particle 1, in which a gap between the insulating layer 3 and the core 2 hardly occurs, and which has excellent long-term durability and an excellent insulating property, is obtained.

The average film thickness of the thus formed insulating layer 3 is preferably about 0.1 to 20%, and more preferably about 0.3 to 10% with respect to the average particle diameter of the core 2. If the average film thickness of the insulating layer 3 is within the above range, the insulator-coated soft magnetic particle 1 (insulator-coated soft magnetic powder) has a sufficient insulating property, and also when a powder magnetic core is produced by press molding an aggregate of the insulator-coated soft magnetic particles 1, a significant decrease in the density of the powder magnetic core is prevented, and as a result, a significant decrease in the magnetic permeability and the magnetic flux density of the powder magnetic core can be prevented. That is, the insulator-coated soft magnetic particle 1 capable of producing a powder magnetic core having a low eddy current loss and also having a high magnetic permeability and a high magnetic flux density is obtained.

The average thickness of the insulating layer 3 can be determined by calculation from the amount of the insulating particles 30 and the amount of the cores 2 used when producing the insulator-coated soft magnetic particle 1.

In the thus obtained insulator-coated soft magnetic particle 1, the content of an alkali metal in the insulating layer 3 is 5 mol % or less.

In such an insulator-coated soft magnetic particle 1, the decrease in the insulating property of the insulating layer 3 can be suppressed even if it is subject to a high temperature for a long period of time. Therefore, with the use of the insulator-coated soft magnetic particle 1, a powder magnetic core and a magnetic element each having high reliability at a high temperature can be realized.

The content of the alkali metal in the insulating layer 3 is preferably 1 mol % or less, more preferably 0.5 mol % or less.

On the other hand, it is not necessary to particularly set the lower limit of the content of the alkali metal, however, from the viewpoint of suppression of the individual difference among the insulator-coated soft magnetic particles 1 or the like, it is set to 0.001 mol % or more.

The content of the alkali metal in the insulating layer 3 can be decreased by using insulating particles having a low alkali metal content as the insulating particles 30 or by sufficiently washing the core 2, the container 110 of the powder coating device 101, or the like.

The content of the alkali metal in the insulating layer 3 is measured, for example, by inductively coupled plasma optical emission spectrometry (ICP). At this time, a pretreatment such as shaving off of the insulating layer 3 from the insulator-coated soft magnetic particle 1 (a treatment of separation of the insulating layer 3) may be performed as needed.

Examples of the alkali metal include Li, Na, K, Rb, Cs, and Fr. The content of the alkali metal is the sum of the contents (molar ratios) of these six elements.

The thus obtained insulator-coated soft magnetic particles 1 may be classified as needed. Examples of the classification method include dry classification such as sieve classification, inertial classification, and centrifugal classification, and wet classification such as sedimentation classification.

Before being fed into the powder coating device 101, the cores 2 and the insulating particles 30 may be stirred (mixed) by a stirrer or a mixer or the like.

The volume resistivity of the powder, which is an aggregate of the insulator-coated soft magnetic particles 1, in a compressed state, that is, when it is formed into a green compact is preferably 1 kΩ·cm or more and 500 kΩ·cm or less, more preferably 5 kΩ·cm or more and 300 kΩ·cm or less, and further more preferably 10 kΩ·cm or more and 200 kΩ·cm or less. Such a volume resistivity is achieved without using an additional insulating material, and therefore is based on the insulating property between the insulator-coated soft magnetic particles 1 itself. Therefore, when the insulator-coated soft magnetic particles 1 which achieve such a volume resistivity are used, since insulation between the insulator-coated soft magnetic particles 1 is sufficient, the amount of an additional insulating material can be reduced, and thus, the proportion of the soft magnetic powder in a powder magnetic core or the like can be increased to the maximum by that amount. As a result, a powder magnetic core which highly achieves both high magnetic properties and a low loss simultaneously can be realized.

The volume resistivity described above is a value measured as follows.

First, 0.8 g of the insulator-coated soft magnetic powder to be measured is filled in a cylinder made of alumina. Then, electrodes made of brass are disposed on the upper and lower sides of the cylinder.

Then, an electrical resistance between the electrodes on the upper and lower sides is measured using a digital multimeter while applying a pressure of 10 MPa between the electrodes on the upper and lower sides using a digital force gauge.

Then, the volume resistivity is calculated by substituting the measured electrical resistance, the distance between the electrodes when applying the pressure, and the internal cross-sectional area of the cylinder into the following calculation formula.

Volume resistivity (kΩ·cm)=Electrical resistance (kΩ)×Internal cross-sectional area of cylinder ($cm^2$)/Distance between electrodes (cm)

The internal cross-sectional area of the cylinder can be obtained according to the formula: $\pi r^2$ (cm$^2$) when the inner diameter of the cylinder is represented by 2r (cm).

The average particle diameter of the insulator-coated soft magnetic particles 1 is preferably 1 μm or more and 50 μm or less, more preferably 3 μm or more and 30 μm or less. By using the insulator-coated soft magnetic particles 1 having such an average particle diameter, a path through which an eddy current flows can be shortened, and therefore, the insulator-coated soft magnetic particles 1 capable of sufficiently suppressing an eddy current loss generated in the particles are obtained. Further, since the average particle diameter is moderately small, the filling property when the powder is compacted can be enhanced. As a result, the filling density of a powder magnetic core can be increased, and thus, the saturation magnetic flux density and the magnetic permeability of the powder magnetic core can be increased.

The average particle diameter of the insulator-coated soft magnetic particles 1 is a particle diameter at a cumulative frequency of 50% from a small diameter side in a cumulative frequency distribution on a volume basis obtained by a laser diffraction-type particle size distribution analyzer.

Powder Magnetic Core and Magnetic Element

Next, the powder magnetic core according to this embodiment and the magnetic element according to this embodiment will be described.

The magnetic element according to this embodiment can be applied to a variety of magnetic elements including a magnetic core such as a choke coil, an inductor, a noise filter, a reactor, a transformer, a motor, an actuator, an antenna, an electromagnetic wave absorber, a solenoid valve, and an electrical generator. Further, the powder magnetic core according to this embodiment can be applied to magnetic cores included in these magnetic elements.

Hereinafter, as an example of the magnetic element, two types of choke coils will be described as representatives.

First Embodiment

First, a choke coil to which a magnetic element according to a first embodiment is applied will be described.

Figure 4:
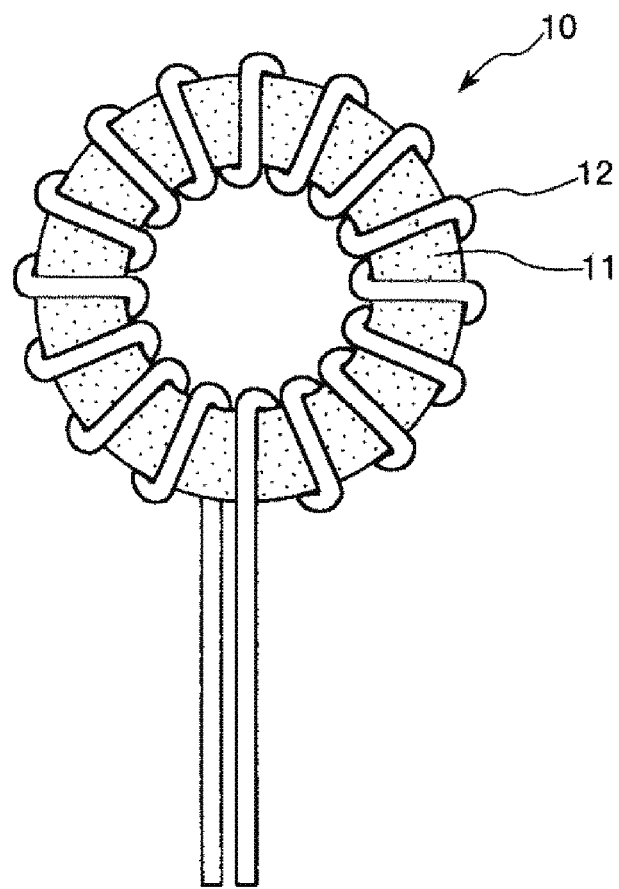
FIG. 4 is a schematic view (plan view) showing a choke coil, to which a magnetic element according to a first embodiment is applied.

FIG. 4 is a schematic view (plan view) showing the choke coil to which the magnetic element according to the first embodiment is applied.

A choke coil 10 shown in FIG. 4 includes a powder magnetic core 11 having a ring shape (toroidal shape) and a conductive wire 12 wound around the powder magnetic core 11. Such a choke coil 10 is generally referred to as "toroidal coil".

The powder magnetic core 11 is obtained by mixing the insulator-coated soft magnetic powder including the insulator-coated soft magnetic particles 1 described above, a binding material (binder), and an organic solvent, supplying the obtained mixture into a mold, and press molding the mixture. That is, the powder magnetic core 11 includes the insulator-coated soft magnetic powder according to this embodiment. Such a powder magnetic core 11 has a high magnetic permeability, and therefore, has improved magnetic properties. Further, the coercive force of the insulator-coated soft magnetic powder is low, and therefore, a low iron loss is achieved. As a result, when the powder magnetic core 11 is mounted on an electronic device or the like, the power consumption of the electronic device or the like can be reduced or the performance thereof can be enhanced, and it can contribute to the improvement of reliability at a high temperature of the electronic device or the like.

Further, as described above, the choke coil 10 which is one example of the magnetic element includes the powder magnetic core 11. Therefore, the choke coil 10 has enhanced performance and reduced iron loss. As a result, when the choke coil 10 is mounted on an electronic device or the like, the power consumption of the electronic device or the like can be reduced or the performance thereof can be enhanced, and it can contribute to the improvement of reliability at a high temperature of the electronic device or the like.

Examples of the constituent material of the binding material to be used for producing the powder magnetic core 11 include organic materials such as a silicone-based resin, an epoxy-based resin, a phenolic resin, a polyamide-based resin, a polyimide-based resin, and a polyphenylene sulfide-based resin, and inorganic materials such as phosphates such as magnesium phosphate, calcium phosphate, zinc phosphate, manganese phosphate, and cadmium phosphate, and silicates (liquid glass) such as sodium silicate, and particularly, a thermosetting polyimide-based resin or a thermosetting epoxy-based resin is preferred. These resin materials are easily cured by heating and have excellent heat resistance. Therefore, the ease of production of the powder magnetic core 11 and also the heat resistance thereof can be enhanced.

The binding material may be used according to need and may be omitted. Even in such a case, in the insulator-coated soft magnetic powder, insulation between particles is achieved, and therefore, the occurrence of a loss accompanying the conduction of electricity between particles can be suppressed.

The ratio of the binding material to the insulator-coated soft magnetic powder slightly varies depending on the desired saturation magnetic flux density or mechanical properties, the allowable eddy current loss, etc. of the powder magnetic core 11 to be produced, but is preferably about 0.5 mass % or more and 5 mass % or less, more preferably about 1 mass % or more and 3 mass % or less. According to this, the powder magnetic core 11 having excellent magnetic properties such as saturation magnetic flux density and magnetic permeability can be obtained while sufficiently binding the particles of the insulator-coated soft magnetic powder.

The organic solvent is not particularly limited as long as it can dissolve the binding material, but examples thereof include various solvents such as toluene, isopropyl alcohol, acetone, methyl ethyl ketone, chloroform, and ethyl acetate.

In the above-mentioned mixture, any of a variety of additives may be added for an arbitrary purpose as needed.

On the other hand, examples of the constituent material of the conductive wire 12 include materials having high electrical conductivity, for example, metal materials including Cu, Al, Ag, Au, Ni, and the like.

It is preferred that on the surface of the conductive wire 12, a surface layer having an insulating property is provided. According to this, a short circuit between the powder magnetic core 11 and the conductive wire 12 can be reliably prevented. Examples of the constituent material of such a surface layer include various resin materials.

Next, a method for producing the choke coil 10 will be described.

First, the insulator-coated soft magnetic powder, a binding material, all sorts of necessary additives, and an organic solvent are mixed, whereby a mixture is obtained.

Subsequently, the mixture is dried to obtain a block-shaped dry material. Then, this dried material is pulverized, whereby a granulated powder is formed.

Subsequently, this granulated powder is molded into a shape of a powder magnetic core to be produced, whereby a molded body is obtained.

A molding method in this case is not particularly limited, however, examples thereof include press molding, extrusion molding, and injection molding methods. The shape and size of this molded body are determined in anticipation of shrinkage when heating the molded body in the subsequent step. Further, the molding pressure in the case of press molding is set to about 1 t/cm$^2$ (98 MPa) or more and 10 t/cm$^2$ (981 MPa) or less.

Subsequently, by heating the obtained molded body, the binding material is cured, whereby the powder magnetic core 11 is obtained. The heating temperature at this time slightly varies depending on the composition of the binding material or the like, however, in the case where the binding material is composed of an organic material, the heating temperature is set to preferably about 100° C. or higher and 500° C. or lower, more preferably about 120° C. or higher and 250° C. or lower. Further, the heating time varies depending on the heating temperature, but is set to about 0.5 hours or more and 5 hours or less.

As described above, the powder magnetic core 11 formed by press molding the insulator-coated soft magnetic powder according to this embodiment and the choke coil 10 formed by winding the conductive wire 12 around the powder magnetic core 11 along the outer peripheral surface thereof are obtained.

The shape of the powder magnetic core 11 is not limited to the ring shape shown in FIG. 4, and may be, for example, a shape of a ring which is partially missing or may be a rod shape.

The powder magnetic core 11 may contain a soft magnetic powder other than the insulator-coated soft magnetic powder according to the above-mentioned embodiment as needed.

Second Embodiment

Next, a choke coil to which a magnetic element according to a second embodiment is applied will be described.

Figure 5:
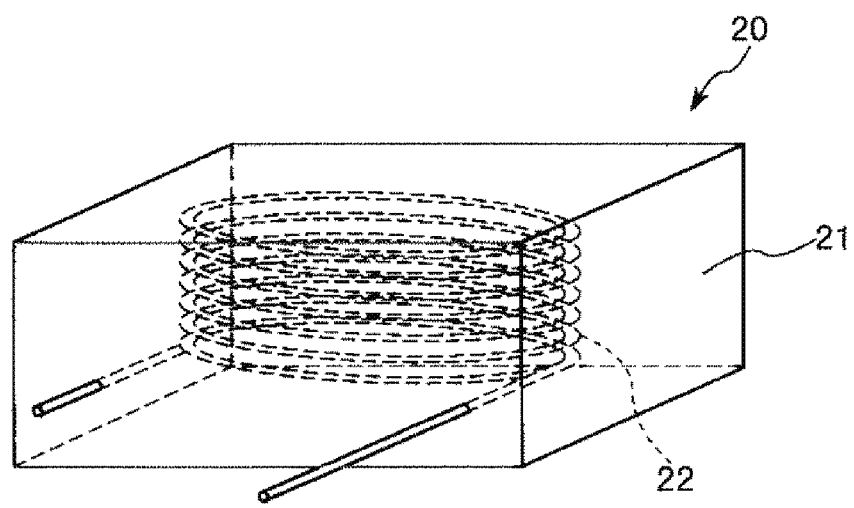
FIG. 5 is a schematic view (transparent perspective view) showing a choke coil, to which a magnetic element according to a second embodiment is applied.

FIG. 5 is a schematic view (transparent perspective view) showing the choke coil to which the magnetic element according to the second embodiment is applied.

Hereinafter, the choke coil to which the second embodiment is applied will be described, however, in the following description, different points from the choke coil to which the first embodiment is applied will be mainly described and the description of the same matter will be omitted.

A choke coil 20 shown in FIG. 5 is obtained by embedding a conductive wire 22 molded into a coil shape inside a powder magnetic core 21. That is, the choke coil 20 is obtained by molding the conductive wire 22 with the powder magnetic core 21.

According to the choke coil 20 having such a configuration, a relatively small choke coil is easily obtained. In the case where such a small choke coil 20 is produced, by using the powder magnetic core 21 having a high saturation magnetic flux density and a high magnetic permeability, and also having a low loss, the choke coil 20 which has a low loss and generates low heat so as to be able to cope with a large current although the size is small is obtained.

Further, since the conductive wire 22 is embedded inside the powder magnetic core 21, a void is hardly generated between the conductive wire 22 and the powder magnetic core 21. According to this, vibration of the powder magnetic core 21 due to magnetostriction is suppressed, and thus, it is also possible to suppress the generation of noise accompanying this vibration.

In the case where the choke coil 20 as described above is produced, first, the conductive wire 22 is disposed in a cavity of a mold, and also the granulated powder containing the insulator-coated soft magnetic powder is filled in the cavity. That is, the granulated powder is filled therein so as to include the conductive wire 22.

Subsequently, the granulated powder is pressed together with the conductive wire 22, whereby a molded body is obtained.

Subsequently, in the same manner as in the above-mentioned first embodiment, the obtained molded body is subjected to a heat treatment. By doing this, the binding material is cured, whereby the powder magnetic core 21 and the choke coil 20 are obtained.

The powder magnetic core 21 may contain a soft magnetic powder other than the insulator-coated soft magnetic powder according to the above-mentioned embodiment as needed.

Electronic Device

Next, an electronic device (an electronic device according to this embodiment) including the magnetic element according to this embodiment will be described in detail with reference to FIGS. 6 to 8.

Figure 6:
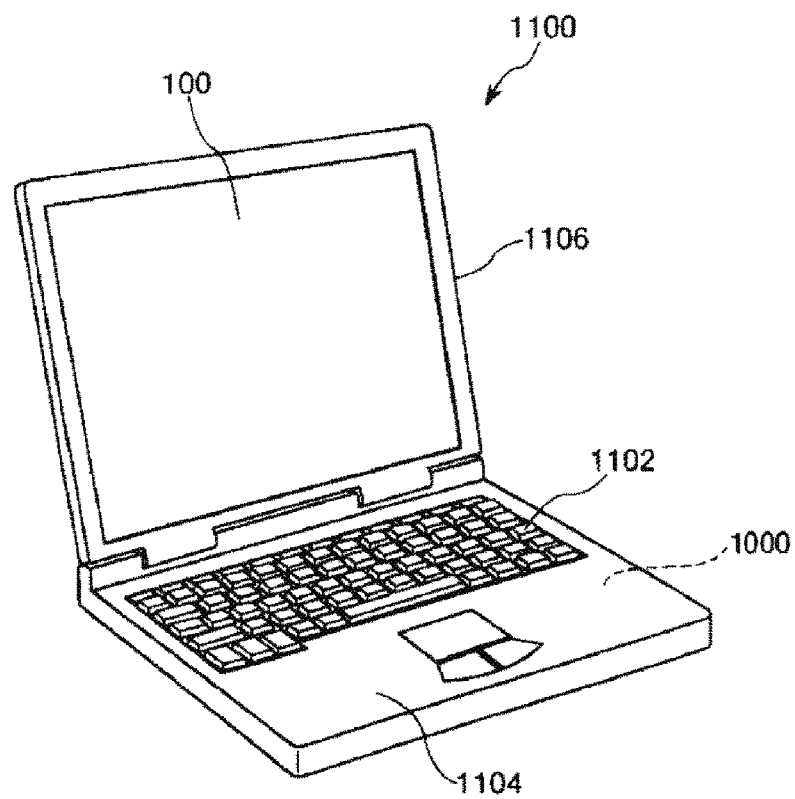
FIG. 6 is a perspective view showing a structure of a mobile (or notebook) personal computer, to which an electronic device including the magnetic element according to the embodiment is applied.

FIG. 6 is a perspective view showing a structure of a mobile (or notebook) personal computer, to which the electronic device including the magnetic element according to this embodiment is applied. In this drawing, a personal computer 1100 includes a main body 1104 provided with a key board 1102, and a display unit 1106 provided with a display section 100. The display unit 1106 is supported rotatably with respect to the main body 1104 via a hinge structure. Such a personal computer 1100 has, for example, a built-in magnetic element 1000 such as a choke coil, an inductor, or a motor for a switched-mode power supply.

Figure 7:
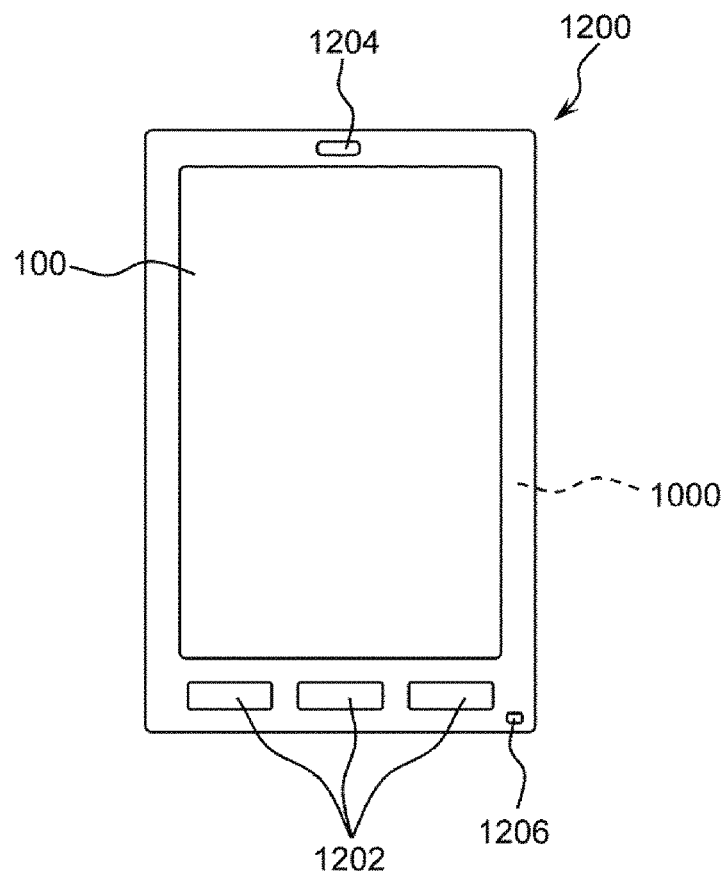
FIG. 7 is a plan view showing a structure of a smartphone, to which an electronic device including the magnetic element according to the embodiment is applied.

FIG. 7 is a plan view showing a structure of a smartphone, to which the electronic device including the magnetic element according to this embodiment is applied. In this drawing, a smartphone 1200 includes a plurality of operation buttons 1202, an earpiece 1204, and a mouthpiece 1206, and between the operation buttons 1202 and the earpiece 1204, a display section 100 is placed. Such a smartphone 1200 has, for example, a built-in magnetic element 1000 such as an inductor, a noise filter, or a motor.

Figure 8:
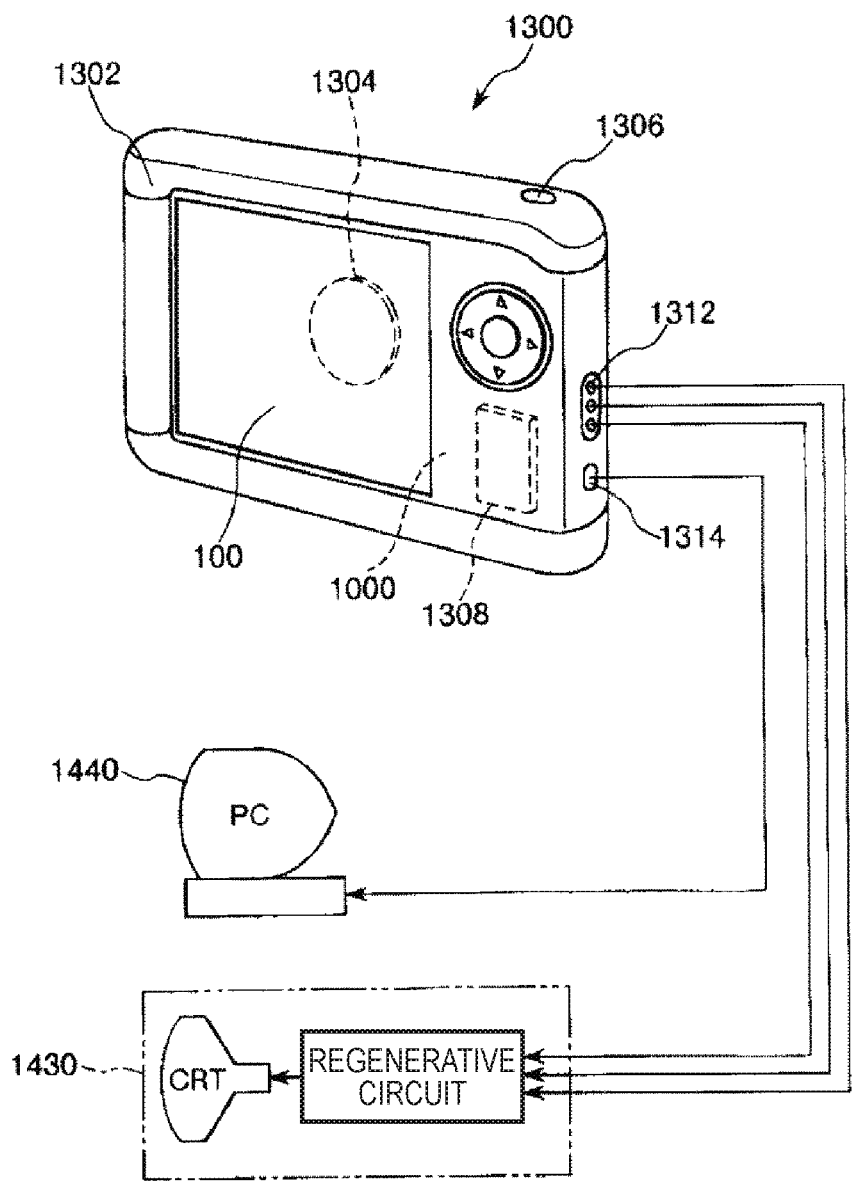
FIG. 8 is a perspective view showing a structure of a digital still camera, to which an electronic device including the magnetic element according to the embodiment is applied.

FIG. 8 is a perspective view showing a structure of a digital still camera, to which the electronic device including the magnetic element according to this embodiment is applied. In this drawing, connection to external devices is also briefly shown. A digital still camera 1300 generates an imaging signal (image signal) by photoelectrically converting an optical image of a subject by an imaging element such as a CCD (Charge Coupled Device).

On a back surface of a case (body) 1302 in the digital still camera 1300, a display section 100 is provided, and is configured to display an image taken on the basis of the imaging signal by the CCD. The display section 100 functions as a finder which displays a subject as an electronic image. Further, on the front surface side (on the back surface side in the drawing) of the case 1302, a light receiving unit 1304 including an optical lens (an imaging optical system), a CCD, or the like is provided.

When a person who takes a picture confirms an image of a subject displayed on the display section 100 and pushes a shutter button 1306, an imaging signal of the CCD at that time point is transferred to a memory 1308 and stored there. Further, a video signal output terminal 1312 and an input/output terminal 1314 for data communication are provided on aside surface of the case 1302 in this digital still camera 1300. As shown in the drawing, a television monitor 1430 and a personal computer 1440 are connected to the video signal output terminal 1312 and the input/output terminal 1314 for data communication, respectively, as needed. Moreover, the digital still camera 1300 is configured such that the imaging signal stored in the memory 1308 is output to the television monitor 1430 or the personal computer 1440 by a predetermined operation. Also such a digital still camera 1300 has, for example, a built-in magnetic element 1000 such as an inductor or a noise filter.

Such an electronic device includes the above-mentioned magnetic element, and therefore has excellent reliability.

The electronic device according to this embodiment can be applied to, other than the personal computer (mobile personal computer) shown in FIG. 6, the smartphone shown in FIG. 7, and the digital still camera shown in FIG. 8, for example, cellular phones, tablet terminals, timepieces, inkjet type ejection devices (for example, inkjet printers), laptop personal computers, televisions, video cameras, videotape recorders, car navigation devices, pagers, electronic notebooks (including those having a communication function), electronic dictionaries, electronic calculators, electronic gaming devices, word processors, work stations, television telephones, television monitors for crime prevention, electronic binoculars, POS terminals, medical devices (for example, electronic thermometers, blood pressure meters, blood sugar meters, electrocardiogram monitoring devices, ultrasound diagnostic devices, and electronic endoscopes), fish finders, various measurement devices, gauges (for example, gauges for vehicles, airplanes, and ships), vehicle control devices (for example, control devices for driving automobiles, etc.), flight simulators, and the like.

Vehicle

Next, a vehicle (a vehicle according to this embodiment) including the magnetic element according to this embodiment will be described with reference to FIG. 9.

Figure 9:
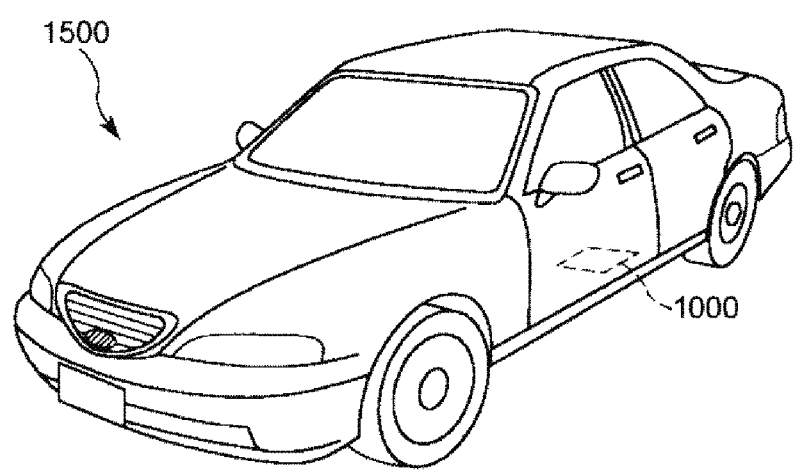
FIG. 9 is a perspective view showing an automobile, to which a vehicle including the magnetic element according to the embodiment is applied.

FIG. 9 is a perspective view showing an automobile, to which the vehicle including the magnetic element according to the embodiment is applied.

An automobile 1500 has a built-in magnetic element 1000. Specifically, the magnetic element 1000 is built in, for example, electronic control units (ECU) such as a car navigation system, an anti-lock brake system (ABS), an engine control unit, a battery control unit for hybrid automobiles or electric automobiles, a car body posture control system, and a self-driving system, and a variety of automobile components such as a driving motor, a generator, and air conditioning unit.

Such a vehicle includes the above-mentioned magnetic element, and therefore has excellent reliability.

The vehicle according to this embodiment can be applied to, for example, a two-wheeled vehicle, a bicycle, an airplane, a helicopter, a drone, a ship, a submarine, a railroad, a rocket, a spaceship, and the like other than the automobile shown in FIG. 9.

Hereinabove, the invention has been described based on the preferred embodiments, but the invention is not limited thereto, and the configuration of each component may be replaced with an arbitrary configuration having the same function.

Further, in the invention, an arbitrary configuration may be added to the above-mentioned embodiment.

Further, in the above-mentioned embodiment, as an application example of the insulator-coated soft magnetic powder according to the invention, the powder magnetic core is described, however, the application example is not limited thereto, and for example, it may be applied to a magnetic shielding sheet or a magnetic device such as a magnetic head.

Further, the shapes of the powder magnetic core and the magnetic element are also not limited to those shown in the drawings and may be any shapes.

EXAMPLES

Next, specific examples of the invention will be described.

1. Production of Insulator-Coated Soft Magnetic Powder

Example 1

First, a metal powder (metal particles) of an Fe-3.5Si-4.5Cr-based alloy produced by a water atomization method was prepared. This metal powder is an Fe-based alloy powder containing 4.5 mass % of Cr and 3.5 mass % of Si. The average particle diameter of the metal powder was 10 μm.

On the other hand, a powder of a $B_2O_3$-based glass material containing ZnO and $B_2O_3$ was prepared. The average particle diameter of this powder was 3 μm and the softening point of the glass material was 350° C.

Subsequently, the metal powder and the glass powder were fed into a friction mixer, and mechanical compression and friction actions were generated. By doing this, the glass powder was adhered to the surfaces of the metal particles, whereby an insulator-coated soft magnetic powder was obtained.

The average thickness of the insulating layer obtained by calculation was 10 nm.

Examples 2 to 8

Insulator-coated soft magnetic powders were obtained in the same manner as in Example 1 except that the conditions for the glass material were changed as shown in Table 1.

Comparative Examples 1 and 2

Insulator-coated soft magnetic powders were obtained in the same manner as in Example 1 except that the conditions for the glass material were changed as shown in Table 1.

Reference Example

An insulator-coated soft magnetic powder was obtained in the same manner as in Example 1 except that the formation of the insulating layer was omitted.

2. Evaluation of Insulator-Coated Soft Magnetic Powder 2.1. Measurement of Electrical Resistance at High Temperature 2 g of each of the insulator-coated soft magnetic powders of the respective Examples, Comparative Examples, and Reference Example was filled in a cylindrical container made of alumina with an inner diameter of 8 mm. Then, electrodes made of brass were disposed on the upper and lower sides of the container.

Subsequently, the container, the electrodes, and the insulator-coated soft magnetic powder were heated to a temperature of 150° C.

Subsequently, a pressure of 40 kg/cm$^2$ was applied between the electrodes on the upper and lower sides using a digital force gauge.

Subsequently, while applying the load, a voltage of 100 V was applied between the electrodes on the upper and lower sides, and an electrical resistance between the electrodes was measured using a digital multimeter.

Subsequently, an electrical resistance between the electrodes was repeatedly measured with the lapse of time.

The electrical resistance after 1 hour, 20 hours, 90 hours, and 720 hours from the start of heating is shown in Table 1.

2.2. Measurement of Electrical Breakdown Voltage 2 g of each of the insulator-coated soft magnetic powders of the respective Examples, Comparative Examples, and Reference Example was filled in a cylindrical container made of alumina with an inner diameter of 8 mm. Then, electrodes made of brass were disposed on the upper and lower sides of the container.

Subsequently, a pressure of 40 kg/cm$^2$ was applied between the electrodes on the upper and lower sides using a digital force gauge.

Subsequently, while applying the load, a voltage of 50 V was applied between the electrodes on the upper and lower sides for 2 seconds at normal temperature (25° C.), and an electrical resistance between the electrodes was measured using a digital multimeter.

Subsequently, the voltage was increased to 100 V and applied for 2 seconds, and an electrical resistance between the electrodes was measured again.

Thereafter, an electrical resistance between the electrodes was repeatedly measured while increasing the voltage to 200 V, 250 V, 300 V, and so on, in increments of 50 V. The increase in the voltage and the measurement were repeated until an electrical breakdown occurred.

In the case where an electrical breakdown did not occur even when the voltage was increased to 1000 V, the measurement was finished at that time.

The above measurement was performed each one 3 times by changing the powder to a new one, and the smallest measurement value is shown in Table 1.

TABLE 1

| | | | Unit | Example 1 | Example 2 | Example 3 | Example 4 | Example 5 | Example 6 |
|---|---|---|---|---|---|---|---|---|---|
| Production conditions for insulator-coated soft magnetic powder | Glass material | Bi$_2$O$_3$ | mol % | 46 | 51 | 55 | 60 | 65 | 51 |
| | | ZnO | mol % | 27 | 24 | 23 | 20 | 16 | 20 |
| | | B$_2$O$_3$ | mol % | 21 | 19 | 18 | 19.8 | 16 | 25 |
| | | Al$_2$O$_3$ | mol % | 1 | 1 | 1 | 0.1 | 1 | |
| | | SiO$_2$ | mol % | 5 | 5 | 3 | 0.1 | 2 | 4 |
| | | P$_2$O$_5$ | mol % | | | | | | |
| | | Li$_2$O | mol % | | | | | | |
| | | Na$_2$O | mol % | | | | | | |
| | | Total | mol % | 100 | 100 | 100 | 100 | 100 | 100 |
| | | Alkali metal | — | 10 ppm (0.001%) | 50 ppm (0.005%) | 100 ppm (0.01%) | 200 ppm (0.02%) | 500 ppm (0.05%) | 2000 ppm (0.2%) |
| | Average thickness of insulating layer | | nm | 10 | 5 | 8 | 18 | 12 | 50 |
| Evaluation results of insulator-coated soft magnetic powder | Electrical resistance at high temperature | After 1 h | MΩ | 100000 | 100000 | 100000 | 100000 | 100000 | 80000 |
| | | After 20 h | MΩ | 30000 | 100000 | 100000 | 100000 | 20000 | 10000 |
| | | After 90 h | MΩ | 100000 | 100000 | 100000 | 100000 | 50000 | 20000 |
| | | After 720 h | MΩ | 100000 | 100000 | 100000 | 100000 | 50000 | 20000 |
| | Electrical breakdown voltage | | V | >1000 | >1000 | >1000 | >1000 | 900 | 800 |

| | | | Unit | Example 7 | Example 8 | Comparative Example 1 | Comparative Example 2 | Reference Example |
|---|---|---|---|---|---|---|---|---|
| Production conditions for insulator-coated soft magnetic powder | Glass material | Bi$_2$O$_3$ | mol % | 70 | 65 | | 40 | |
| | | ZnO | mol % | 15 | 10 | 39 | 30 | |
| | | B$_2$O$_3$ | mol % | 9 | 8 | | | |
| | | Al$_2$O$_3$ | mol % | 1 | 2 | | | |
| | | SiO$_2$ | mol % | 5 | 15 | | | |
| | | P$_2$O$_5$ | mol % | | | 49 | | |
| | | Li$_2$O | mol % | | | 6 | | |
| | | Na$_2$O | mol % | | | 6 | 30 | |
| | | Total | mol % | 100 | 100 | 100 | 100 | |
| | | Alkali metal | — | 10000 ppm (1.0%) | 20000 ppm (2.0%) | 8% | 20% | 0% |

TABLE 1-continued

|  |  |  |  |  |  |  |  |  |
|---|---|---|---|---|---|---|---|---|
|  | Average thickness of insulating layer |  | nm | 25 | 100 | 20 | 20 | 0 |
| Evaluation results of insulator-coated soft magnetic powder | Electrical resistance at high temperature | After 1 h | MΩ | 100000 | 30000 | 1000 | 10000 | 0 |
|  |  | After 20 h | MΩ | 100000 | 5000 | 9 | 100 | 0 |
|  |  | After 90 h | MΩ | 100000 | 10000 | 3 | 20 | 0 |
|  |  | After 720 h | MΩ | 100000 | 10000 | 1 | 5 | 0 |
|  | Electrical breakdown voltage |  | V | >1000 | 700 | 500 | 600 | 0 |

As apparent from table 1, it was confirmed that the insulator-coated soft magnetic powders of the respective Examples have a favorable insulating property even at a high temperature as compared with the insulator-coated soft magnetic powders of the respective Comparative Examples and Reference Example. Further, the insulator-coated soft magnetic powders of the respective Examples showed a high electrical breakdown voltage.

The entire disclosure of Japanese Patent Application No. 2017-190946 filed Sep. 29, 2017 is expressly incorporated by reference herein.

What is claimed is:

1. An insulator-coated soft magnetic powder, comprising a plurality of particles, each particle including:
   a core which contains a soft magnetic material; and
   an insulating layer which is provided on an entire outer surface of the core, the insulating layer containing a glass material including $Bi_2O_3$ as a main component, an amount of $Bi_2O_3$ being 40 mol % or more and 65 mol % or less,
   wherein the insulating layer contains 5 mol % or less of an alkali metal.

2. The insulator-coated soft magnetic powder according to claim 1, wherein the glass material further contains at least one of ZnO and $B_2O_3$.

3. The insulator-coated soft magnetic powder according to claim 1, wherein the plurality of particles have an average particle diameter of 1 μm or more and 50 μm or less.

4. A powder magnetic core, comprising:
   the insulator-coated soft magnetic powder according to claim 1;
   a binder; and
   an organic solvent.

5. A magnetic element, comprising:
   the powder magnetic core according to claim 4; and
   a conductive wire operatively associated with the powder magnetic core.

6. An electronic device, comprising:
   the magnetic element according to claim 5;
   a housing; and
   a display.

7. A vehicle, comprising:
   the magnetic element according to claim 6
   a body; and
   a propulsion system.

8. An insulator-coated soft magnetic powder, comprising a plurality of particles, each particle including:
   a core which contains a soft magnetic material; and
   an insulating layer which is provided on an entire outer surface of the core, the insulating layer containing $Bi_2O_3$ as a main component, an amount of the $Bi_2O_3$ being 40 mole % or more and 65 mole % or less,
   wherein the insulating layer contains 5 mol % or less of an alkali metal.

9. The insulator-coated soft magnetic powder according to claim 8, wherein the soft magnetic material further comprises an Fe based alloy.

10. The insulator-coated soft magnetic powder according to claim 8, wherein the insulating layer further contains at least one of ZnO and $B_2O_3$.

11. The insulator-coated soft magnetic powder according to claim 10, wherein a content of ZnO in the insulating layer is 15 mol % or more and 70 mol % or less with respect to a content of the $Bi_2O_3$.

12. The insulator-coated soft magnetic powder according to claim 10, wherein a content of $B_2O_3$ in the insulating layer is 15 mol % or more and 70 mol % or less with respect to a content of the $Bi_2O_3$.

13. The insulator-coated soft magnetic powder according to claim 10, wherein the insulating layer contains both the ZnO and the $B_2O_3$ and a ratio of a mol % content of the $B_2O_3$ to a mol % content of the ZnO is 0.7 or more and 1.1 or less.

14. The insulator-coated soft magnetic powder according to claim 10, wherein the insulating layer further contains least one of $SiO_2$ and $Al_2O_3$ at a content less than that of the at least one of ZnO and $B_2O_3$.

15. The insulator-coated soft magnetic powder according to claim 8, wherein the insulating layer has a softening point of 250° C. or higher and 600° C. or lower.

16. The insulator-coated soft magnetic powder according to claim 8, wherein each insulating particle further includes 10 mass % or less of an electrically non-conductive inorganic material.

17. The insulator-coated soft magnetic powder according to claim 8, wherein the plurality of particles have an average particle diameter of 0.3 μm or more and 20 μm or less.

18. The insulator-coated soft magnetic powder according to claim 8, wherein the insulating layer is mechanically adhered to the core.

* * * * *